(12) United States Patent
Nakashima et al.

(10) Patent No.: US 12,212,209 B2
(45) Date of Patent: Jan. 28, 2025

(54) MOTOR UNIT

(71) Applicants: ADVICS CO., LTD., Kariya (JP); AISIN CORPORATION, Kariya (JP)

(72) Inventors: Yasuhito Nakashima, Kariya (JP); Atsushi Inoue, Kariya (JP); Kyohei Asahi, Kariya (JP); Keiji Ogawa, Kariya (JP)

(73) Assignees: ADVICS CO., LTD., Kariya (JP); AISIN CORPORATION, Kariya (JP)

( * ) Notice: Subject to any disclaimer, the term of this patent is extended or adjusted under 35 U.S.C. 154(b) by 240 days.

(21) Appl. No.: 18/068,709

(22) Filed: Dec. 20, 2022

(65) Prior Publication Data

US 2023/0208244 A1    Jun. 29, 2023

(30) Foreign Application Priority Data

Dec. 28, 2021    (JP) .................................. 2021-215025

(51) Int. Cl.
*H02K 5/10*    (2006.01)
*B60T 13/14*   (2006.01)

(52) U.S. Cl.
CPC .............. *H02K 5/10* (2013.01); *B60T 13/148* (2013.01)

(58) Field of Classification Search
CPC ....................................................... H02K 5/10
See application file for complete search history.

(56) References Cited

U.S. PATENT DOCUMENTS

2023/0208244 A1\* 6/2023 Nakashima ............. B60T 13/74
310/88

FOREIGN PATENT DOCUMENTS

JP    2011-106574 A    6/2011

\* cited by examiner

*Primary Examiner* — Robert W Horn
(74) *Attorney, Agent, or Firm* — Oblon, McClelland, Maier & Neustadt, L.L.P.

(57) ABSTRACT

A motor unit includes: a motor provided with a first chamber and including a shaft; a rotary member coupled to the shaft outside the first chamber; a housing provided with a second chamber accommodating the rotary member; and a guide member including a peripheral wall between the first chamber and the second chamber, the guide member being provided with a third chamber inside the peripheral wall, wherein the motor unit is provided with a fourth chamber which is outside the first chamber and is open to an inner surface of the second chamber and/or the third chamber, the inner surface of the third chamber includes a guide, and the guide extends farther away from a rotation axis as is closer to the fourth chamber.

8 Claims, 3 Drawing Sheets

MOTOR UNIT

CROSS-REFERENCE TO RELATED APPLICATIONS

This application is based upon and claims the benefit of priority from Japanese Patent Application No. 2021-215025, filed Dec. 28, 2021, the entire contents of which are incorporated herein by reference.

FIELD

An embodiment of the present invention relates to a motor unit.

BACKGROUND

Motors function to rotate various kinds of objects, which may have attached thereto liquid such as lubricating oil or oil fed by a pump, for example. Traditionally, motor devices with a flow path are known. The flow path extends between the motor and the object for discharging the liquid. Such liquid is discharged from the flow path and thus prevented from entering the motor.

In such a traditional motor device, the liquid flowing downward by gravity can be discharged from the flow path. However, the liquid scattered by a rotational member as a motor shaft may adhere to the inner surface of the device. The liquid may flow toward the inside of the motor along the inner surface of the device.

SUMMARY

According to one embodiment of the present invention, a motor unit includes: a motor provided with a first chamber and including a shaft rotatable around a rotation axis, a rotor rotatable around the rotation axis together with the shaft, and a stator surrounding the rotor, the rotor and the stator being accommodated in the first chamber; a rotary member coupled to the shaft outside the first chamber, and rotatable around the rotation axis; a housing to which the motor is attached, and being provided with a second chamber accommodating at least a part of the rotary member; and a guide member including a peripheral wall located between the first chamber and the second chamber and surrounding the rotation axis, the guide member being provided with a third chamber communicating with the second chamber inside the peripheral wall, wherein the motor unit is provided with a fourth chamber which is outside the first chamber and is open to at least one of an inner surface of the second chamber and an inner surface of the third chamber in a direction intersecting with the rotation axis, the inner surface of the third chamber includes a guide being closer to the fourth chamber than the rotation axis in a radial direction orthogonal to the rotation axis, and the guide extends farther away from the rotation axis as is closer to the fourth chamber in an axial direction extending along the rotation axis. As an example, the shaft and the rotary member may rotate while having liquid adhered thereto. In such a case the liquid scatters by centrifugal force. In this regard, the peripheral wall surrounds the rotation axis, so that the scattering liquid can be received by the inside of the third chamber. By placing the motor with the fourth chamber located below the rotation axis, the liquid received by the inside of the third chamber flows by gravity into the fourth chamber along the guide. As such, the motor unit can prevent the scattered liquid from entering the first chamber.

DETAILED DESCRIPTION

Hereinafter, an embodiment will be described with reference to FIGS. 1 to 3. Note that, in this specification, components according to the embodiment and the description of the components will be described by a plurality of expressions. The components and the description thereof serve as an example, and are not limited by the expressions in this specification. The components can be identified by names different from those in this specification. In addition, the components can be described by expressions different from those in this specification.

Figure 1:
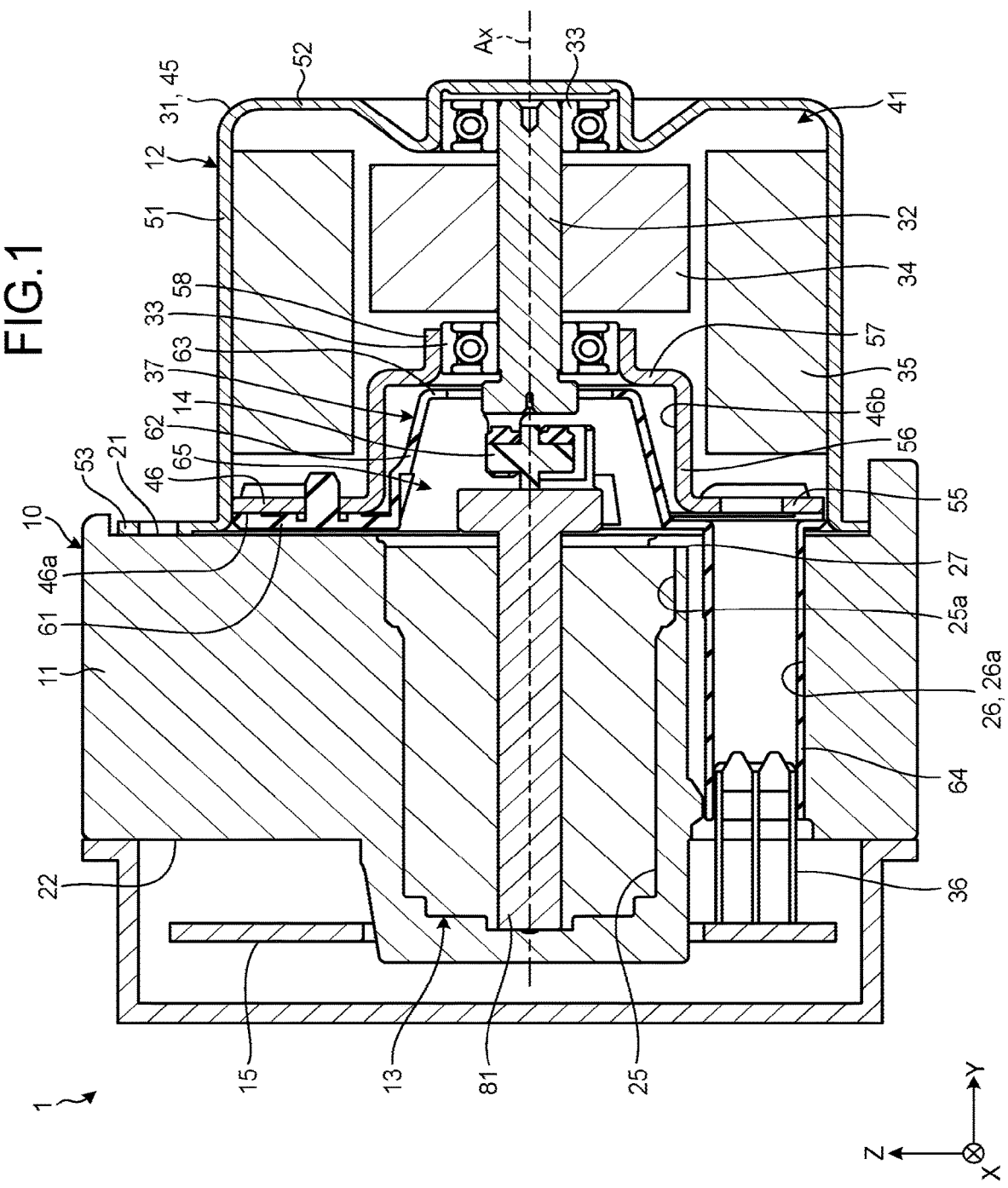
FIG. 1 is a cross-sectional view schematically illustrating a hydraulic control device according to an embodiment.

FIG. 1 is a cross-sectional view schematically illustrating a hydraulic control device 10 according to an embodiment. The hydraulic control device 10 is an example of a motor unit, and can also be referred to as a pump unit. The hydraulic control device 10 is mounted on a vehicle 1 such as an automobile, for example. The hydraulic control device 10 adjusts pressure (hydraulic pressure) on a flow path of a brake device of the vehicle 1. Note that the motor unit is not limited to the hydraulic control device 10.

As illustrated in each drawing, in this specification, an X-axis, a Y-axis, and a Z-axis are defined for the sake of convenience. The X-axis, the Y-axis, and the Z-axis are orthogonal to each other. The X-axis is provided along the width of the hydraulic control device 10. The Y-axis is provided along the length of the hydraulic control device 10. The Z-axis is provided along the height of the hydraulic control device 10.

Furthermore, in this specification, an X direction, a Y direction, and a Z direction are defined. The X direction is a direction extending along the X-axis, and includes a +X direction indicated by an arrow of the X-axis, and a −X direction being an opposite direction of the arrow of the X-axis. The Y direction is a direction extending along the Y-axis, and includes a +Y direction indicated by an arrow of the Y-axis, and a −Y direction being an opposite direction of the arrow of the Y-axis. The Z direction is a direction extending along the Z-axis, and includes a +Z direction (upper direction) indicated by an arrow of the Z-axis, and a −Z direction (lower direction) being an opposite direction of the arrow of the Z-axis.

The +Z direction is a vertical upper direction set in a case where the vehicle 1 is arranged on a horizontal ground surface, for example. The −Z direction is a vertical lower direction set in a case where the vehicle 1 is similarly arranged on a horizontal ground surface. Note that the hydraulic control device 10 may be arranged in such a manner that the Z direction is different from a vertical direction.

The hydraulic control device 10 includes a housing 11, a motor 12, a pump 13, a coupling 14, and an electronic control unit (ECU) 15. The coupling 14 is an example of a joint. The hydraulic control device 10 further includes various components such as a solenoid valve, a pressure sensor, and a reservoir.

The housing 11 is a substantially rectangular parallelepiped block formed of metal or synthetic resin, for example. Note that the housing 11 is not limited to this example. The motor 12, the pump 13, and the ECU 15 are attached to the housing 11. Other various components are also attached to the housing 11.

The housing 11 includes a first mounting surface 21 and a second mounting surface 22. The first mounting surface 21 and the second mounting surface 22 are outer surfaces of the housing 11. The first mounting surface 21 is substantially flat, and faces the +Y direction. The second mounting surface 22 is opposite the first mounting surface 21. The second mounting surface 22 is substantially flat, and faces the −Y direction.

The housing 11 is provided with a pump mounting hole 25, a through-hole 26, and a communication groove 27. The pump mounting hole 25 is an example of a second chamber. The through-hole 26 is an example of a fifth chamber. The communication groove 27 is an example of a fourth chamber. In addition, the housing 11 may be provided with another hole and another groove. Furthermore, the housing 11 is provided with various flow paths.

The pump mounting hole 25 is a recess recessed from the first mounting surface 21 substantially in the −Y direction. The pump mounting hole 25 is open to an approximate center of the first mounting surface 21. The pump mounting hole 25 is connected to a flow path of the brake device through a flow path provided in the housing 11, for example.

The through-hole 26 penetrates through the housing 11 substantially in the Y direction. Thus, the through-hole 26 is open to the first mounting surface 21 and the second mounting surface 22. The through-hole 26 is separated from the pump mounting hole 25 in the −Z direction. Thus, the through-hole 26 is located below the pump mounting hole 25. Note that the through-hole 26 may be separated from the pump mounting hole 25 in another direction.

The communication groove 27 is open to the first mounting surface 21, and extends between the pump mounting hole 25 and the through-hole 26. Thus, the communication groove 27 is open to an inner surface 25a of the pump mounting hole 25 and to an inner surface 26a of the through-hole 26. The inner surface 25a is an inner surface of the housing 11 that forms, defines, or sections the pump mounting hole 25. The inner surface 26a is an inner surface of the housing 11 that forms the through-hole 26. The pump mounting hole 25 and the through-hole 26 each communicate with the communication groove 27. In addition, the through-hole 26 communicates with the pump mounting hole 25 through the communication groove 27.

The motor 12 is a three-phase brushless motor, for example. Note that the motor 12 may be a motor of another type. The motor 12 includes a casing 31, a motor shaft 32, two bearings 33, a rotor 34, a stator 35, an electrode 36, and a slope member 37. The motor shaft 32 is an example of a shaft. The slope member 37 is an example of a guide member. The slope member 37 in the present embodiment is included in the motor 12. Nevertheless, the slope member 37 may be a component different from the motor 12.

The casing 31 is attached to the first mounting surface 21 of the housing 11. Thus, the first mounting surface 21 is oriented toward the motor 12. The casing 31 covers the pump mounting hole 25, the through-hole 26, and the communication groove 27.

The casing 31 has an internal space 41. The internal space 41 is an example of a first chamber. A part of the motor shaft 32, at least one of the bearings 33, the rotor 34, and the stator 35 are accommodated in the internal space 41.

The motor shaft 32 is supported by the bearings 33 to be rotatable around an axis Ax. The axis Ax is an example of a rotation axis. The axis Ax is a center of the rotation of the motor shaft 32.

The axis Ax is the axis of the motor shaft 32, for example. Note that a center of the rotation of the motor shaft 32 may be different from the axis of the motor shaft 32. In addition, the axis Ax includes not only an axis inside the motor shaft 32, but also an extended line of the axis outside of the motor shaft 32. The axis Ax extends substantially in the Y direction. A part of the motor shaft 32 protrudes from the internal space 41 in the −Y direction.

In the present embodiment, an axial direction, a radial direction, and a circumferential direction are defined for the sake of convenience. The axial direction is a direction extending along the axis Ax. In other words, the axial direction in the present embodiment is substantially equal to the Y direction. The radial direction is a direction orthogonal to the axis Ax. The circumferential direction is a direction around the axis Ax.

The pump mounting hole 25 of the housing 11 is located on the axis Ax. The through-hole 26 of the housing 11 is separated from the pump mounting hole 25 in the radial direction. In addition, the communication groove 27 of the housing 11 extends substantially in the radial direction, and allows the pump mounting hole 25 and the through-hole 26 to communicate with each other. Thus, the communication groove 27 is open to the inner surface 25a of the pump mounting hole 25 substantially in the radial direction.

The rotor 34 is coupled to the motor shaft 32. Thus, the rotor 34 is rotatable around the axis Ax together with the motor shaft 32. The stator 35 surrounds the rotor 34 and is fixed to the casing 31. By drive current flowing into the stator 35, the rotor 34 and the motor shaft 32 integrally rotate around the axis Ax.

The casing 31 includes an outer frame 45 and an end frame 46. The internal space 41 is a space surrounded by the outer frame 45 and the end frame 46. In other words, the internal space 41 is defined by the outer frame 45 and the end frame 46. Note that the internal space 41 is not limited to this example.

The outer frame 45 includes an outer wall 51, an end wall 52, and a mounting flange 53. The outer wall 51 has a substantially cylindrical shape extending in the axial direction, and surrounds the axis Ax. The end wall 52 blocks an end portion in the +Y direction of the outer wall 51. The end wall 52 supports one of the bearings 33. The mounting flange 53 extends from an end portion in the −Y direction of the outer wall 51 toward the outside in the radial direction along the first mounting surface 21.

The end frame 46 is attached to the outer frame 45, and blocks the −Y directional end of the outer wall 51. The end frame 46 includes an end wall 55, an inner wall 56, a bottom wall 57, and a support wall 58.

The end wall 55 has a substantially annular shape substantially orthogonal to the axis Ax and extending in the circumferential direction. The inner wall 56 has a substantially cylindrical shape extending in the +Y direction from the radially inside end of the end wall 55, and surrounds the axis Ax.

The bottom wall 57 protrudes radially inward from the +Y direction end of the inner wall 56. The bottom wall 57 has a substantially-annular shape, and surrounds the axis Ax.

The support wall 58 has a substantially-cylindrical shape extending in the +Y direction from the radially inside end of the inner wall 56, and surrounds the axis Ax. The support wall 58 supports the other one of the bearings 33.

The end frame 46 includes an outer surface 46a and a recessed surface 46b. The outer surface 46a is provided on the end wall 55, and faces the outside of the motor 12. The outer surface 46a is oriented in the −Y direction, for example. The outer surface 46a of the motor 12 and the first mounting surface 21 of the housing 11 face each other. The outer surface 46a is separated from the first mounting surface 21.

The recessed surface 46b is provided on the inner wall 56 and the bottom wall 57. The recessed surface 46b is recessed from the outer surface 46a substantially in the +Y direction (axial direction). The recessed surface 46b is located outside the internal space 41. The space inside the recessed surface 46b communicates with the internal space 41 through the space inside the support wall 58. The bearing 33 supported by the support wall 58 separates the inside space of the recessed surface 46b and the internal space 41.

The mounting flange 53 of the outer frame 45 is attached to the housing 11 using a screw, for example. For example, a seal material is provided between the mounting flange 53 and the first mounting surface 21. The seal material seals a space between the casing 31 and the first mounting surface 21 in a liquid-tight manner.

The electrode 36 is a terminal for supplying drive current to the motor 12, for example, and is electrically-connected to the stator 35. Note that the electrode 36 may be a terminal electrically connected to a sensor provided in the motor 12.

The electrode 36 protrudes substantially in the −Y direction from the outer surface 46a of the end frame 46. The electrode 36 penetrates through the through-hole 26 over the second mounting surface 22. In other words, the electrode 36 is at least partially accommodated in the through-hole 26.

The slope member 37 is formed of an insulator such as synthetic resin, for example. Note that the material of the slope member 37 is not limited to this example. The slope member 37 includes an outer wall 61, a peripheral wall 62, a flange 63, and a cover 64. The flange 63 can also be referred to as a rib. The outer wall 61, the peripheral wall 62, the flange 63, and the cover 64 are integrated together.

The outer wall 61 has a substantially annular shape substantially orthogonal to the axis Ax and extending in the circumferential direction. The outer wall 61 is located between the first mounting surface 21 of the housing 11 and the end wall 55 of the end frame 46. The outer wall 61 is attached to the end frame 46, for example, and covers the outer surface 46a. Note that the outer wall 61 may be attached to the housing 11.

The outer wall 61 covers the communication groove 27 open to the first mounting surface 21. With this configuration, the communication groove 27 can serve as a flow path connecting the pump mounting hole 25 and the through-hole 26. In other words, a flow path (the communication groove 27) connecting the pump mounting hole 25 and the through-hole 26 extends between the housing 11 and the motor 12. Note that, in the above-described configuration, the flow path connecting the pump mounting hole 25 and the through-hole 26 is formed by providing a groove (the communication groove 27) on the housing 11 side, but the flow path may be formed by providing a groove on the motor 12 side such as the outer wall 61, for example, in place of this.

Figure 2:
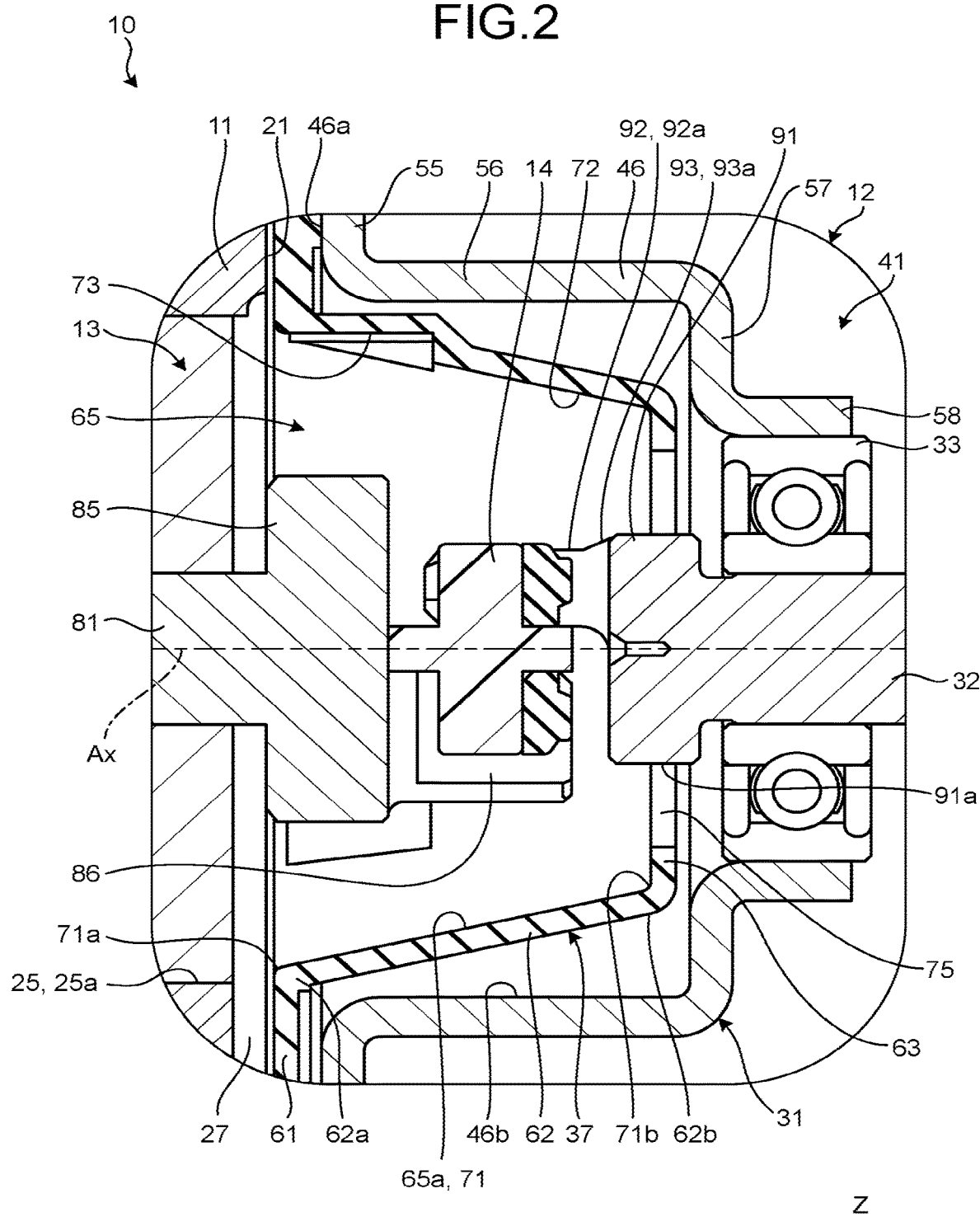
FIG. 2 is a cross-sectional view schematically illustrating a part of the hydraulic control device according to the embodiment.

FIG. 2 is a cross-sectional view schematically illustrating a part of the hydraulic control device 10 according to the present embodiment. As illustrated in FIG. 2, the peripheral wall 62 has a tubular shape surrounding the axis Ax. A −Y directional end 62a of the peripheral wall 62 is connected to a radially inside end of the outer wall 61.

The peripheral wall 62 is located inside the recessed surface 46b of the end frame 46. Thus, the peripheral wall 62 is located in a space inside the recessed surface 46b between the internal space 41 and the pump mounting hole 25 of the housing 11. Note that at least a part of the peripheral wall 62 may fall outside the inside space of the recessed surface 46b.

A connected space 65 is formed inside the peripheral wall 62. The connected space 65 is an example of a third chamber. The connected space 65 is a space surrounded by the peripheral wall 62, and is formed by the peripheral wall 62. The connected space 65 communicates with the pump mounting hole 25 of the housing 11. In addition, the connected space 65 communicates with the internal space 41 through a space inside the support wall 58.

The peripheral wall 62 includes an inner surface 65a of the connected space 65. The inner surface 65a also serves as an inner surface of the peripheral wall 62 having a tubular shape. In other words, the inner surface 65a of the peripheral wall 62 forms the connected space 65. In the present embodiment, the inner surface 65a is a curved surface having a substantially circular cone shape (funnel shape), for example.

The inner surface 65a tapers in the +Y direction. In other words, the inner surface 65a tapers toward the internal space 41. Thus, the diameter of the inner surface 65a lengthens as is closer to the pump mounting hole 25. In other words, as is closer to the pump mounting hole 25 in the axial direction, the inner surface 65a extends farther away from the axis Ax. The diameter of the inner surface 65a may change uniformly or in a stepwise manner. Note that the inner surface 65a is not limited to this example.

The inner surface 65a includes a lower portion 71 and an upper portion 72. The lower portion 71 is an example of a guide. The lower portion 71 is a part (lower half) of the inner surface 65a below the axis Ax. Thus, in the radial direction the lower portion 71 is closer to the through-hole 26 and the communication groove 27 than the axis Ax. The upper portion 72 is a part (upper half) of the inner surface 65a above the axis Ax.

As described above, the diameter of the inner surface 65a lengthens as is closer to the pump mounting hole 25. In addition, the communication groove 27 is open to the inner surface 25a of the pump mounting hole 25. Thus, in the axial direction the lower portion 71 of the inner surface 65a extends farther away from the axis Ax as is closer to the communication groove 27.

The lower portion 71 includes a first end 71a and a second end 71b. The first end 71a is a −Y directional end of the lower portion 71. In other words, the first end 71a is a closer one of two axial ends of the lower portion 71 relative to the pump mounting hole 25. The second end 71b is the other of the axial ends of the lower portion 71. In other words, the second end 71b is a +Y directional end of the lower portion 71.

For example, an angle between the axis Ax and the lower portion 71 is set larger than an allowable angle between the axis Ax and the horizontal direction at the time of manufacturing the vehicle 1. In this case, even in a manufactured vehicle 1 with the axis Ax tilting with respect to the horizontal direction within the allowable angle range, a lowermost portion of the first end 71a is located below a lowermost portion of the second end 71b. In other words, the lower portion 71 extends while tilting obliquely downward from the second end 71b to the first end 71a.

In the present embodiment, the entire inner surface 65a has a substantially circular cone shape. Nevertheless, the upper portion 72 may have a substantially cylindrical shape extending in the axial direction, for example. In addition, the shape of a cross-section of the connected space 65 that is orthogonal to the axis Ax is not limited to a circular shape, and may be another shape such as a square.

A plurality of recesses 73 may be provided on the inner surface 65a. For example, the recesses 73 are used for chucking in manufacturing. The plurality of recesses 73 is arranged at intervals in the circumferential direction. The plurality of recesses 73 is separated from a lowermost portion of the inner surface 65a, at each position in the axial direction.

The flange 63 protrudes toward the axis Ax from an end 62b of the peripheral wall 62. The end 62b is a closer one of two axial ends of the peripheral wall 62 relative to the internal space 41. The flange 63 has a substantially annular shape, and surrounds the axis Ax. Thus, the flange 63 is provided with a hole 75 inside. The axis Ax extends through the hole 75.

As illustrated in FIG. 1, the cover 64 is located below the peripheral wall 62, and protrudes substantially in the −Y direction from the outer wall 61. The electrode 36 extends through the inside of the cover 64. The cover 64 is accommodated in the through-hole 26 of the housing 11 together with the electrode 36. In the through-hole 26, the cover 64 covers the electrode 36 and protects the electrode 36. In the vicinity of the second mounting surface 22, a clearance gap between the inner surface 26a of the through-hole 26 and the cover 64 is sealed in a liquid-tight manner.

The pump 13 is a gear pump, for example. Note that the pump 13 may be a pump of another type. At least a part of the pump 13 is accommodated in the pump mounting hole 25. The pump 13 can feed operating oil to a flow path of the brake device.

The pump 13 includes a pump shaft 81. The pump shaft 81 is an example of a rotary member. The pump shaft 81 is disposed substantially concentric with respect to the motor shaft 32, and extends in the axial direction. Note that the axis of the pump shaft 81 and the axis Ax of the motor shaft 32 may deviate slightly from each other.

The pump shaft 81 is coupled to a rotator of the pump 13, for example. The pump shaft 81 is rotatable around the axis Ax together with the rotator of the pump 13. By the rotation of the pump shaft 81 and the rotator of the pump 13 around the axis Ax, the pump 13 feeds the operating oil.

A part of the pump shaft 81 and the rotator of the pump 13 are accommodated in the pump mounting hole 25. The other part of the pump shaft 81 protrudes toward the outside of the pump mounting hole 25, and is accommodated in the connected space 65.

The motor shaft 32 and the pump shaft 81 are coupled to each other in the connected space 65 via the coupling 14. In other words, the motor shaft 32 and the pump shaft 81 are coupled to each other inside the recessed surface 46b, which is outside the internal space 41. Note that the motor shaft 32 and the pump shaft 81 may be directly coupled to each other.

Figure 3:
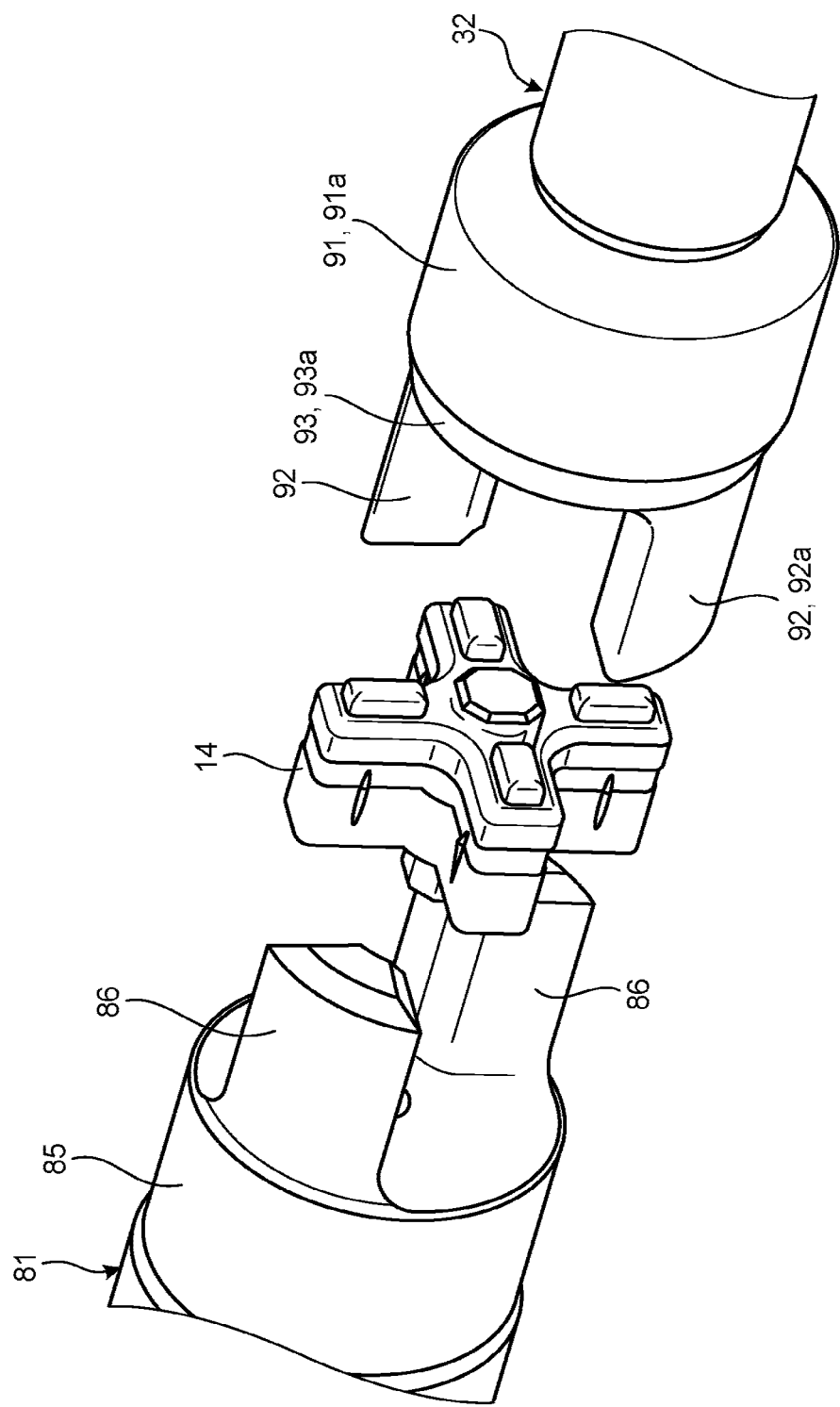
FIG. 3 is an exploded, perspective view illustrating a coupling, a motor shaft, and a pump shaft according to the embodiment.

FIG. 3 is a perspective view illustrating the coupling 14, the motor shaft 32, and the pump shaft 81 according to the present embodiment in an exploded manner. As illustrated in FIG. 3, the pump shaft 81 includes a base portion 85 and two clicks 86.

The base portion 85 is a part of the pump shaft 81 at least partially accommodated in the connected space 65. The base portion 85 has a substantially columnar shape extending in the axial direction. The two clicks 86 protrude substantially in the +Y direction from the base portion 85. The two clicks 86 are arranged at a substantially-equal interval in the circumferential direction.

The motor shaft 32 includes a base portion 91, two clicks 92, and an intermediate portion 93. As illustrated in FIG. 2, the base portion 91 is a part of the motor shaft 32 that is outside of the internal space 41. The base portion 91 has a substantially columnar shape extending in the axial direction. The base portion 91 extends through the hole 75, and is surrounded by the flange 63. A part of the base portion 91 is positioned in the connected space 65.

The two clicks 92 protrude substantially in the −Y direction from the base portion 91. The two clicks 92 are arranged at a substantially-equal interval in the circumferential direction. The clicks 92 are positioned between the base portion 91 and the base portion 85 of the pump shaft 81. The clicks 92 are closer to the pump mounting hole 25 than the base portion 91. The clicks 92 of the motor shaft 32 and the clicks 86 of the pump shaft 81 are alternately arranged in the circumferential direction.

The coupling 14 is interposed between the clicks 92 of the motor shaft 32 and the clicks 86 of the pump shaft 81. Thus, the clicks 92 of the motor shaft 32 and the clicks 86 of the pump shaft 81 can convey force for rotation around the axis Ax to each other via the coupling 14. In this manner, the coupling 14 couples the motor shaft 32 and the pump shaft 81. Note that the motor shaft 32 and the pump shaft 81 may be coupled by another joint such as a universal joint.

As illustrated in FIG. 3, the base portion 91 of the motor shaft 32 includes an outer circumferential surface 91a. The outer circumferential surface 91a is an example of a first outer circumferential surface. The outer circumferential surface 91a is a curved surface having a cylindrical shape extending substantially in the axial direction, and is oriented outward in the radial direction. The outer circumferential surface 91a is surrounded by the flange 63.

The two clicks 92 each include an outer circumferential surface 92a. The outer circumferential surface 92a is an example of a second outer circumferential surface. The outer circumferential surface 92a is a curved surface having a cylindrical shape extending substantially in the axial direction, and is oriented outward in the radial direction. The outer circumferential surface 92a is closer to the pump mounting hole 25 than the outer circumferential surface 91a of the base portion 91. The outer circumferential surface 92a of the click 92 is shorter in outer diameter than the outer circumferential surface 91a of the base portion 91.

The outer circumferential surface 91a and the outer circumferential surface 92a may not have a cylindrical shape. In this case, a portion of an end of the outer circumferential surface 92a in the +Y direction that is farthest from the axis Ax is closer to the axis Ax than a portion of an end of the outer circumferential surface 91a in the −Y direction that is farthest from the axis Ax.

The intermediate portion 93 is located between the base portion 91 and the clicks 92. The intermediate portion 93 includes an outer circumferential surface 93a. The outer circumferential surface 93a is an example of a third outer circumferential surface. The outer circumferential surface 93a connects the outer circumferential surface 91a and the base portion 91 and the outer circumferential surface 92a of the click 92. Since the outer circumferential surface 92a is shorter in outer diameter than the outer circumferential surface 91a, the outer circumferential surface 93a intersects with the outer circumferential surface 91a and the outer circumferential surface 92a.

For example, the outer circumferential surface 93a extends in a substantially circular cone shape between the outer circumferential surface 91a of the base portion 91 and the outer circumferential surface 92a of the click 92. Note that the outer circumferential surface 93a may be orthogonal to the outer circumferential surface 91a and the outer circumferential surface 92a.

The ECU 15 in FIG. 1 includes a substrate and various electric components mounted on the substrate, for example. Furthermore, the ECU 15 is electrically-connected to the motor 12, for example, and controls the entire hydraulic control device 10. For example, the electrode 36 of the motor 12 is electrically-connected to the ECU 15 by being connected to a connector mounted on the substrate. The ECU 15 supplies drive current to the motor 12 through the electrode 36.

In the hydraulic control device 10 described above, operating oil sometimes leaks from the pump 13. The operating oil moves downward by gravity. The communication groove 27 is open to the lower end of the pump mounting hole 25 in which the pump 13 is accommodated. Thus, the operating oil is discharged from the pump mounting hole 25 to the through-hole 26 through the communication groove 27.

As described above, a space between the casing 31 and the first mounting surface 21, and a clearance gap between the inner surface 26a of the through-hole 26 and the cover 64 are sealed. Thus, the hydraulic control device 10 can reserve operating oil in the through-hole 26 and the communication groove 27, and can prevent operating oil from flowing out to the outside of the hydraulic control device 10.

On the other hand, if the ECU 15 drives the motor 12, the motor shaft 32, the coupling 14, the pump shaft 81, and the rotator of the pump 13 rotate around the axis Ax. The operating oil sometimes adheres to the motor shaft 32, the coupling 14, and the pump shaft 81. Thus, the motor shaft 32, the coupling 14, and the pump shaft 81 that are rotating sometimes scatter operating oil substantially in the radial direction in the connected space 65 by centrifugal force.

The peripheral wall 62 surrounds the axis Ax. Thus, the peripheral wall 62 surrounds the motor shaft 32 extending in the axis Ax, the coupling 14, and the pump shaft 81. The inner surface 65a of the peripheral wall 62 receives operating oil scattered substantially in the radial direction in the connected space 65.

The lower portion 71 extends obliquely downward from the second end 71b toward the first end 71a. Thus, operating oil flows toward the first end 71a along the lower portion 71. In other words, operating oil flows toward the communication groove 27 open to the inner surface 25a of the pump mounting hole 25.

Operating oil adhering to the upper portion 72 flows substantially in the circumferential direction along the upper portion 72 by gravity. The diameter of the upper portion 72 is longer as is closer to the pump mounting hole 25. Thus, operating oil flowing along the upper portion 72 flows in such a manner as to get closer to the communication groove 27 in the axial direction.

As described above, operating oil received by the inner surface 65a of the peripheral wall 62 (the connected space 65) flows in such a manner as to get closer to the communication groove 27. The communication groove 27 of the present embodiment communicates with the connected space 65 via the pump mounting hole 25. Thus, operating oil flowing along the inner surface 65a is discharged from the connected space 65 to the communication groove 27.

The connected space 65, the pump mounting hole 25, the communication groove 27, and the through-hole 26 are all located outside of the internal space 41. Accordingly, by guiding the operating oil scattered in the connected space 65 to the communication groove 27, the hydraulic control device 10 can prevent the operating oil from entering the internal space 41.

For example, operating oil received by the upper portion 72 sometimes flows toward the internal space 41 along the upper portion 72. In this case, the flange 63 receives the operating oil flowing along the upper portion 72. The operating oil flows toward the lower portion 71 along the flange 63 having an annular shape, and is discharged to the communication groove 27 from the lower portion 71.

In addition, for example, by braking of the vehicle 1, the first end 71a of the lower portion 71 is sometimes temporarily positioned superiorly to the second end 71b. In this case, the operating oil sometimes flows toward the internal space 41 along the lower portion 71. Nevertheless, the flange 63 receives the operating oil flowing along the lower portion 71. If tilt caused by braking recovers, operating oil flows toward the communication groove 27 along the lower portion 71.

As described above, the flange 63 receives operating oil flowing on the inner surface 65a toward the internal space 41. Accordingly, the hydraulic control device 10 can prevent operating oil from entering the internal space 41.

The flange 63 is separated from the base portion 91 of the motor shaft 32. A distance between the flange 63 and the base portion 91 is set to a length that can prevent a clearance gap between the flange 63 and the base portion 91 from holding operating oil.

In the motor shaft 32, an outer diameter of the outer circumferential surface 92a of the click 92 is shorter than an outer diameter of the outer circumferential surface 91a of the base portion 91. Thus, the outer circumferential surface 93a of the intermediate portion 93 forms a stepwise portion between the outer circumferential surface 91a and the outer circumferential surface 92a.

Operating oil sometimes flows toward the internal space 41 along the outer circumferential surface 92a of the click 92. In this case, the stepwise portion of the outer circumferential surface 93a receives the operating oil. The outer circumferential surface 93a restricts operating oil from flowing toward the internal space 41 over the outer circumferential surface 93a. The operating oil of which the movement is disturbed by the outer circumferential surface 93a scatters toward the inner surface 65a of the connected space 65 by centrifugal force. Accordingly, the hydraulic control device 10 can prevent operating oil adhering to the motor shaft 32, from entering the internal space 41 over the hole 75.

In the present embodiment, the peripheral wall 62 and the flange 63 are provided over the entire circumference around the axis Ax. Nevertheless, a hole, a cutout, or a slit may be provided on the peripheral wall 62 and the flange 63.

In addition, in the present embodiment, the operating oil is discharged to the communication groove 27 open to the inner surface 25a of the pump mounting hole 25. Alternatively, the operating oil may be discharged in a direction intersecting with the axis Ax to a space (fourth chamber) open to the inner surface 65a of the connected space 65.

In addition, in the present embodiment, the coupling 14, the motor shaft 32, and the pump shaft 81 are positioned in the connected space 65. Nevertheless, one or two of the coupling 14, the motor shaft 32, and the pump shaft 81 may be located outside of the connected space 65.

In addition, in the present embodiment, the motor shaft 32 includes the outer circumferential surfaces 91a, 92a, and 93a. Nevertheless, the coupling 14 or the pump shaft 81 may include a first outer surface surrounded by the flange 63, a second outer surface being closer to the pump mounting hole 25 and having a short outer diameter, and a third outer surface connecting the first outer surface and the second outer surface, and intersecting with the first outer surface and the second outer surface.

In the hydraulic control device 10 according to the present embodiment described above, the slope member 37 includes the peripheral wall 62. The peripheral wall 62 is located between the internal space 41 and the pump mounting hole 25 of the housing 11. The peripheral wall 62 surrounds the axis Ax. The connected space 65 communicates with the pump mounting hole 25 inside the peripheral wall 62. The communication groove 27 extends outside the internal space 41 and is open to at least one of the inner surface 25a of the pump mounting hole 25 and the inner surface 65a of the connected space 65 in a direction intersecting with the axis Ax. The inner surface 65a of the connected space 65 includes the lower portion 71 being closer to the communication groove 27 than the axis Ax in the radial direction orthogonal to the axis Ax. The lower portion 71 extends farther away from the axis Ax as is closer to the communication groove 27 in the axial direction extending along the axis Ax. The motor shaft 32 and the pump shaft 81 may rotate while having the operating oil adhered thereto. In such a case, the operating oil scatters by centrifugal force. Since the peripheral wall 62 surrounds the axis Ax, such scattered operating oil can be received by the inner surface 65a of the connected space 65. By placing the hydraulic control device 10 with the communication groove 27 located below the axis Ax, the operating oil received by the inner surface 65a of the connected space 65 flows by gravity toward the communication groove 27 along the lower portion 71. As such, the hydraulic control device 10 can prevent the scattered operating oil from entering the internal space 41 and adhering to the rotor 34 and the stator 35.

The inner surface 65a of the connected space 65 extends farther away from the axis Ax as is closer to the communication groove 27 in the axial direction. In other words, not only the lower portion 71 but also substantially the entire inner surface 65a of the connected space 65 extend farther away from the axis Ax as are closer to the communication groove 27 in the axial direction. With this configuration, the operating oil received by the inner surface 65a of the connected space 65 above the axis Ax can flow toward the communication groove 27 while flowing downward by gravity. Thus, the hydraulic control device 10 can more efficiently prevent the scattered operating oil from entering the internal space 41.

The motor 12 includes the outer surface 46a facing the housing 11, and the recessed surface 46b being recessed from the outer surface 46a in the axial direction and located outside the internal space 41. The motor shaft 32 is coupled to the pump shaft 81 inside the recessed surface 46b. The peripheral wall 62 is located inside the recessed surface 46b. In other words, the peripheral wall 62 is located in a space inside the recessed surface 46b in which the motor shaft 32 is coupled to the pump shaft 81. This can avoid the hydraulic control device 10 from increasing in size in the axial direction as compared with the one including the peripheral wall 62 located outside of the recessed surface 46b.

Between the two axial ends of the lower portion 71, the lowermost portion of the first end 71a closer to the pump mounting hole 25 is located below the lowermost portion of the second end 71b. In other words, the lower portion 71 extends downward toward the pump mounting hole 25. Thus, the operating oil can flow into the communication groove 27 along the lower portion 71. In this manner, the hydraulic control device 10 can prevent the scattered operating oil from entering the internal space 41.

The slope member 37 includes the flange 63. The flange 63 surrounds the axis Ax and protrudes toward the axis Ax from the end 62b of the peripheral wall 62, the end 62b being closer to the internal space 41 between the two axial ends. Thus, the flange 63 can receive the operating oil while flowing toward the internal space 41 along the inner surface 65a of the connected space 65. Accordingly, the hydraulic control device 10 can more surely prevent the scattered operating oil from entering the internal space 41.

The motor shaft 32, the pump shaft 81, or the coupling 14 includes the outer circumferential surface 91a, the outer circumferential surface 92a, and the outer circumferential surface 93a. The outer circumferential surface 91a is surrounded by the flange 63. The outer circumferential surface 92a is closer to the pump mounting hole 25 than the outer circumferential surface 91a, and shorter in outer diameter than the outer circumferential surface 91a. The outer circumferential surface 93a connects the outer circumferential surface 91a and the outer circumferential surface 92a, and intersects with the outer circumferential surface 91a and the outer circumferential surface 92a. Thus, the operating oil is received by the outer circumferential surface 93a while flowing toward the outer circumferential surface 91a along the outer circumferential surface 92a. The operating oil received by the outer circumferential surface 93a scatters in the radial direction by centrifugal force. In other words, the outer circumferential surface 93a can prevent the operating oil from flowing from the outer circumferential surface 92a to the outer circumferential surface 91a. In this manner, the hydraulic control device 10 can prevent the operating oil adhering to the outer circumferential surface 92a from entering the internal space 41 through the outer circumferential surface 91a.

The motor shaft 32 includes the outer circumferential surface 91a, the outer circumferential surface 92a, and the outer circumferential surface 93a. Among the motor shaft 32, the pump shaft 81, and the coupling 14, the motor shaft 32 is closest to the internal space 41. Most of the operating oil adhering to the pump shaft 81 and the coupling 14 scatters by centrifugal force in the pump shaft 81 and the coupling 14 in the radial direction. In other words, the pump shaft 81 and the coupling 14 can reduce the amount of the operating oil flowing toward the motor shaft 32 along the pump shaft 81 and the coupling 14. The operating oil, when flowing to the motor shaft 32 from the pump shaft 81 and the coupling 14, is received by the outer circumferential surface 93a, and scatters in the radial direction by centrifugal force. As such, the hydraulic control device 10 can reduce the amount of the operating oil flowing toward the outer circumferential surface 93a by the pump shaft 81 and the coupling 14, and more surely prevent the operating oil from entering the internal space 41 through the outer circumferential surface 91a.

The housing 11 is provided with the through-hole 26 communicating with the communication groove 27. The motor 12 includes the electrode 36 accommodated in the through-hole 26. The slope member 37 includes the cover 64 being integrated with the peripheral wall 62 to cover the electrode 36 in the through-hole 26. Thus, the operating oil, when received by the inner surface 65a of the connected space 65, flows into the through-hole 26 through the communication groove 27. The integration of the peripheral wall 62 forming the connected space 65 and the cover 64 covering the electrode 36 makes it possible to prevent the operating oil from adhering to the electrode 36. Furthermore, as compared with the one including the peripheral wall 62 and the cover 64 separated, the hydraulic control device 10 can prevent the operating oil from entering the clearance gap between the slope member 37 and another component, and allows the operating oil to smoothly flow from the connected space 65 to the through-hole 26. In addition, the hydraulic control device 10 can reserve the operating oil in a wider space by allowing the operating oil to flow into the through-hole 26.

In the embodiment, the pump shaft 81 of the pump 13 is an example of a rotary member. Nevertheless, the rotary member is not limited to this example, and may be a gear, an arm, or another rotary member. The motor shaft 32 may be coupled to a rotary member different from the pump 13. In such a case, the slope member 37 can prevent the lubricating oil on the rotary member from entering the internal space 41, for example.

A motor unit according to at least one embodiment described above includes, as an example: a motor provided with a first chamber and including a shaft rotatable around a rotation axis, a rotor rotatable around the rotation axis together with the shaft, and a stator surrounding the rotor, the rotor and the stator being accommodated in the first chamber; a rotary member coupled to the shaft outside the first chamber, and rotatable around the rotation axis; a housing to which the motor is attached, and being provided with a second chamber accommodating at least a part of the rotary member; and a guide member including a peripheral wall located between the first chamber and the second chamber and surrounding the rotation axis, the guide member being provided with a third chamber communicating with the second chamber inside the peripheral wall, wherein the motor unit is provided with a fourth chamber which is outside the first chamber and is open to at least one of an inner surface of the second chamber and an inner surface of the third chamber in a direction intersecting with the rotation axis, the inner surface of the third chamber includes a guide being closer to the fourth chamber than the rotation axis in a radial direction orthogonal to the rotation axis, and the guide extends farther away from the rotation axis as is closer to the fourth chamber in an axial direction extending along the rotation axis. As an example, when the shaft and the rotary member rotate while having liquid adhered thereto, the liquid scatters by centrifugal force. Because of the peripheral wall surrounding the rotation axis, the scattering liquid can be received by the inner surface of the third chamber. By placing the motor unit with the fourth chamber located below the rotation axis, the liquid, when received by the inner surface of the third chamber, flows into the fourth chamber along the guide by gravity. In this manner, the motor unit can prevent the scattered liquid from entering the first chamber and adhering to the rotor and the stator.

In the motor unit, as an example, the inner surface of the third chamber extends farther away from the rotation axis as is closer to the fourth chamber in the axial direction. As an example, the liquid received by the inner surface of the third chamber above the rotation axis can flow toward the fourth chamber while flowing downward by gravity. As such, the motor unit can more efficiently prevent the scattered liquid from entering the first chamber.

In the motor unit, as an example, the motor includes an outer surface facing the housing, and a recessed surface recessed from the outer surface in the axial direction and located outside the first chamber, the shaft is coupled to the rotary member inside the recessed surface, and the peripheral wall is located inside the recessed surface. As an example, the peripheral wall is placed in the space inside the recessed surface in which the shaft is coupled to the rotary member. As such, the motor unit can be prevented from increasing in size in the axial direction as compared with the one including the peripheral wall located outside the recessed surface.

In the motor unit, as an example, between two axial ends of the guide, a lowermost portion of one axial end closer to the second chamber is located below a lowermost portion of the other axial end. As an example, the guide extends downward toward the second chamber. Thus, the liquid flows into the fourth chamber along the guide. In this manner, the motor unit can prevent the scattered liquid from entering the first chamber.

In the motor unit, as an example, the guide member includes a flange that surrounds the rotation axis and protrudes toward the rotation axis from one of two axial ends of the peripheral wall, the one being closer to the first chamber. As an example, the flange can receive the liquid while flowing toward the first chamber along the inner surface of the third chamber. In this manner, the motor unit can more surely prevent the scattered liquid from entering the first chamber.

In the motor unit, as an example, the shaft, the rotary member, or a joint that couples the shaft and the rotary member includes a first outer circumferential surface surrounded by the flange, a second outer circumferential surface closer to the second chamber than the first outer circumferential surface, and a third outer circumferential surface connecting the first outer circumferential surface and the second outer circumferential surface and intersecting with the first outer circumferential surface and the second outer circumferential surface, and the second outer circumferential surface is shorter in outer diameter than the first outer circumferential surface. As an example, the liquid can be received by the third outer circumferential surface while flowing toward the first outer circumferential surface along the second outer circumferential surface. The liquid, when received by the third outer circumferential surface, scatters in the radial direction by centrifugal force. In other words, the third outer circumferential surface can prevent the liquid from flowing from the second outer circumferential surface to the first outer circumferential surface. As such, the motor unit can prevent the liquid adhering to the second outer circumferential surface from entering the first chamber through the first outer circumferential surface.

In the motor unit, as an example, the shaft includes the first outer circumferential surface, the second outer circumferential surface, and the third outer circumferential surface. As an example, since the shaft is closest to the first chamber among the shaft, the rotary member, and the joint, most of the liquid adhering to the rotary member and the joint scatters by centrifugal force within the rotary member and the joint in the radial direction. In other words, the rotary member and the joint can reduce the amount of the liquid flowing toward the shaft along the rotary member and the joint. The liquid, when flowing to the shaft from the rotary member and the joint, is received by the third outer circumferential surface, and scatters in the radial direction by centrifugal force. In this manner, the motor unit can reduce the amount of the liquid flowing toward the third outer circumferential surface by the rotary member and the joint, and more surely prevent the liquid from entering the first chamber through the first outer circumferential surface.

In the motor unit, as an example, the housing is provided with a fifth chamber communicating with the fourth chamber, the motor includes an electrode at least partially accommodated in the fifth chamber, and the guide member includes a cover being integrated with the peripheral wall to cover the electrode in the fifth chamber. As an example, the liquid received by the inner surface of the third chamber flows into the fifth chamber through the fourth chamber. Owing to the integration of the peripheral wall forming the third chamber and the cover covering the electrode, it is possible to prevent the liquid from adhering to the electrode. Furthermore, as compared with the one including the peripheral wall and the cover separated, the motor unit can prevent the liquid from entering the clearance gap between the guide member and another component, and allows the liquid to smoothly flow from the third chamber to the fifth chamber. In addition, the motor unit can reserve liquid in a wider space by allowing the liquid to flow into the fifth chamber.

In the above description, the word "prevent" is defined as preventing the occurrence of an event, an operation, or influence, for example, or reducing the extent of an event, an operation, or influence. In addition, in the above description, the word "restrict" is defined as preventing movement or rotation, or allowing movement or rotation within a predetermined range and preventing movement or rotation that falls outside the predetermined range, for example.

Heretofore, an embodiment of the present invention has been exemplified, but the above-described embodiment and a modified example merely serve as an example, and are not intended to limit the scope of the invention. The above-described embodiment and a modified can be implemented in other various forms, and various omissions, substitutions, combinations, and changes can be made without departing from the gist of the invention. In addition, configurations and shapes in each embodiment and each modified example can be implemented with being partially replaced.

What is claimed is:

1. A motor unit comprising:
  a motor provided with a first chamber and comprising
    a shaft rotatable around a rotation axis,
    a rotor rotatable around the rotation axis together with the shaft, and
    a stator surrounding the rotor, the rotor and the stator being accommodated in the first chamber;
  a rotary member coupled to the shaft outside the first chamber, and rotatable around the rotation axis;
  a housing to which the motor is attached, and being provided with a second chamber accommodating at least a part of the rotary member; and
  a guide member including a peripheral wall located between the first chamber and the second chamber and surrounding the rotation axis, the guide member being provided with a third chamber communicating with the second chamber inside the peripheral wall, wherein
  the motor unit is provided with a fourth chamber which is outside the first chamber and is open to at least one of an inner surface of the second chamber and an inner surface of the third chamber in a direction intersecting with the rotation axis,
  the inner surface of the third chamber includes a guide being closer to the fourth chamber than the rotation axis in a radial direction orthogonal to the rotation axis, and
  the guide extends farther away from the rotation axis as is closer to the fourth chamber in an axial direction extending along the rotation axis.

2. The motor unit according to claim 1, wherein
the inner surface of the third chamber extends farther away from the rotation axis as is closer to the fourth chamber in the axial direction.

3. The motor unit according to claim 1, wherein
the motor includes an outer surface facing the housing, and a recessed surface recessed from the outer surface in the axial direction and located outside the first chamber,
the shaft is coupled to the rotary member inside the recessed surface, and
the peripheral wall is located inside the recessed surface.

4. The motor unit according to claim 1, wherein
between two axial ends of the guide, a lowermost portion of one axial end closer to the second chamber is located below a lowermost portion of the other axial end.

5. The motor unit according to claim 1, wherein
the guide member includes a flange that surrounds the rotation axis and protrudes toward the rotation axis from one of two axial ends of the peripheral wall, the one being closer to the first chamber.

6. The motor unit according to claim 5, wherein
the shaft, the rotary member, or a joint that couples the shaft and the rotary member includes:
  a first outer circumferential surface surrounded by the flange,
  a second outer circumferential surface closer to the second chamber than the first outer circumferential surface, and
  a third outer circumferential surface connecting the first outer circumferential surface and the second outer circumferential surface and intersecting with the first outer circumferential surface and the second outer circumferential surface, and
the second outer circumferential surface is shorter in outer diameter than the first outer circumferential surface.

7. The motor unit according to claim 6, wherein
the shaft includes the first outer circumferential surface, the second outer circumferential surface, and the third outer circumferential surface.

8. The motor unit according to claim 1, wherein
the housing is provided with a fifth chamber communicating with the fourth chamber,
the motor includes an electrode at least partially accommodated in the fifth chamber, and
the guide member includes a cover being integrated with the peripheral wall to cover the electrode in the fifth chamber.

* * * * *